Sept. 22, 1936.  E. T. ALLEN ET AL  2,054,961
LATERAL CONTROL SYSTEM FOR AIRCRAFT
Filed June 21, 1933  2 Sheets-Sheet 1
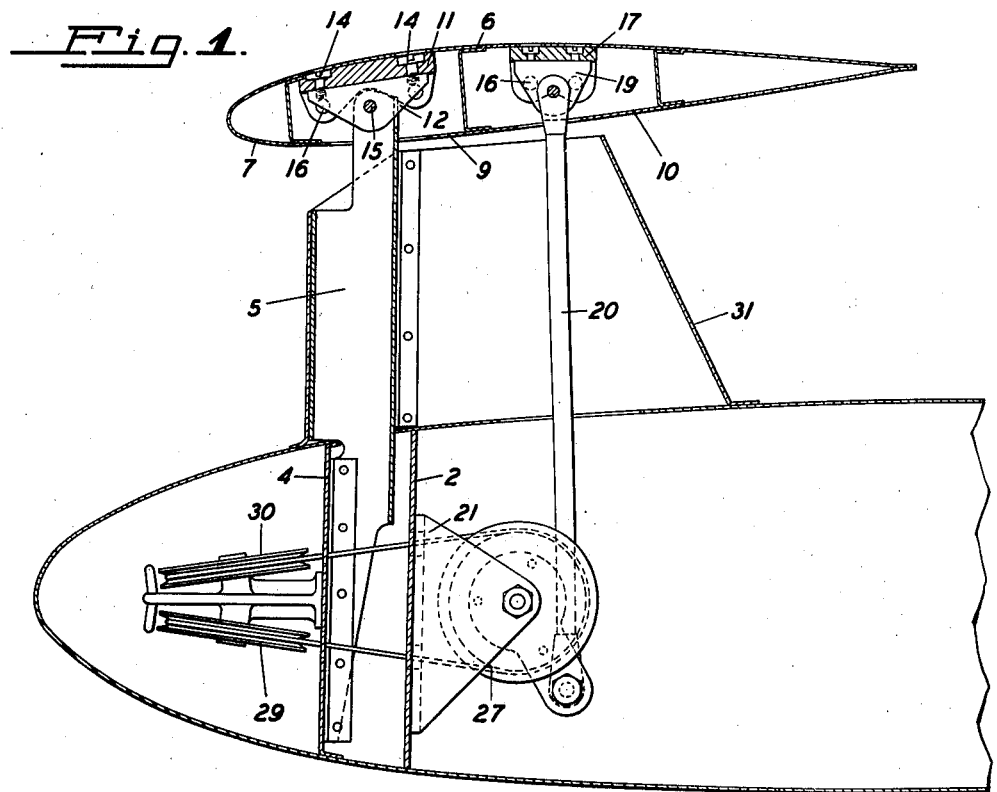
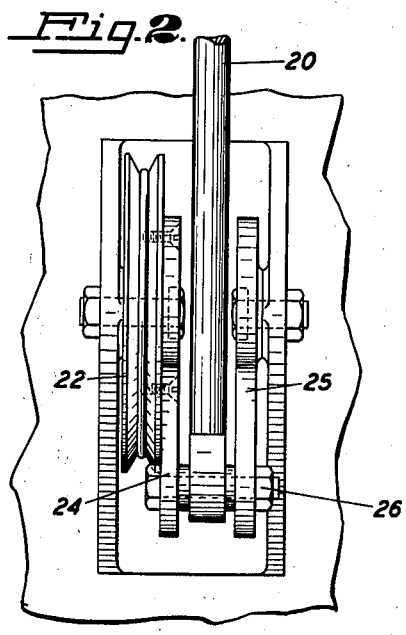
INVENTORS,
EDMUND T. ALLEN
ARTHUR L. KLEIN
CLARK B. MILLIKAN
JOHN K. NORTHROP
BY
ATTORNEY Sept. 22, 1936.　　　E. T. ALLEN ET AL　　　2,054,961
LATERAL CONTROL SYSTEM FOR AIRCRAFT
Filed June 21, 1933　　　2 Sheets-Sheet 2

INVENTORS,
EDMUND T. ALLEN
ARTHUR L. KLEIN
CLARK B. MILLIKAN
JOHN K. NORTHROP
BY Donald K. Lippincott
ATTORNEY Patented Sept. 22, 1936

2,054,961

UNITED STATES PATENT OFFICE 2,054,961

LATERAL CONTROL SYSTEM FOR AIRCRAFT

Edmund T. Allen, Encinitas, Arthur L. Klein, Los Angeles, Clark B. Millikan, Pasadena, and John K. Northrop, Glendale, Calif., assignors to The Northrop Corporation, Inglewood, Calif., a corporation of California Application June 21, 1933, Serial No. 676,892

2 Claims. (Cl. 244—29)

This invention relates to the lateral control of aircraft, and particularly to the size, shape, and location of the lateral control surfaces and the methods involved in their use.

Among the objects of this invention are: To provide a system of lateral control which is highly effective at low speed and at angles of attack approaching stall; to provide a system which is adapted for use with wings carrying any of the various types of wing flaps such as are used to decrease landing speed; to provide a system of control which is sufficiently insensitive at high speed to eliminate the constant danger of over-control while giving full effectiveness at low speed; to provide a type of aileron or equivalent lateral control surface which will produce yawing moments tending to cooperate with and accentuate the rolling moments produced thereby, particularly under spin conditions, instead of producing the opposite effect as is the case with the usual type of aileron; to provide a type of aileron structure which is readily affixed to the wing and at a point of maximum strength; and to provide an aileron structure which is inherently insusceptible to "flutter".

Other objects of this invention will be apparent or will be specifically pointed out in the description forming a part of this specification, but we do not limit ourselves to the embodiment of the invention herein described, as various forms may be adopted within the scope of the claims.

In general terms the control system of this invention involves the use of an auxiliary airfoil or aileron positioned above the leading portion of each wing and controlled by the stick or otherwise in a similar manner to the ordinary aileron, but with such differences as now will be brought out. The neutral position of each of these auxiliary airfoils is parallel to the airflow over the wing in the normal or high speed flying condition. Movement of the control mechanism in one direction or the other to a slight degree varies the relative angles of attack of these airfoils without materially affecting the airflow over the wing, raising the leading edge of one of the ailerons slightly and increasing the lift which it contributes to the wing to which it is attached, while the leading edge of the other airfoil is depressed to a slightly greater degree and the lift which it contributes to its wing is decreased, thus producing the desired rolling moment. At angles of attack approaching stall, where a more powerful action is necessary to produce the desired effect, a continued motion of the control mechanism in the same direction again depresses the leading edge of the airfoil which previously was raised. With the wing at a high attack angle this airfoil now is in position to deflect the airflow over the upper wing surface, holding it to the surface, and giving maximum lift to the entire wing assembly where without the presence of the auxiliary airfoil the flow would become turbulent and the lift of the wing would suddenly drop. At the same time, the leading edge of the other auxiliary airfoil is further depressed, the effect being to deflect the airflow away from the upper surface of this wing, and to cause turbulence sooner than it would otherwise occur, decreasing the lift of the wing and again causing the desired rolling moment. At intermediate speeds, with the corresponding angles of attack, the two effects merge into each other gradually, so that powerful control in roll is at all times available.

Referring to the drawings:

Figure 1 is a cross sectional view through the leading edge of the wing and the aileron, showing the control mechanism.

Figure 2 is a view in elevation of a portion of the control mechanism.

Figure 3:
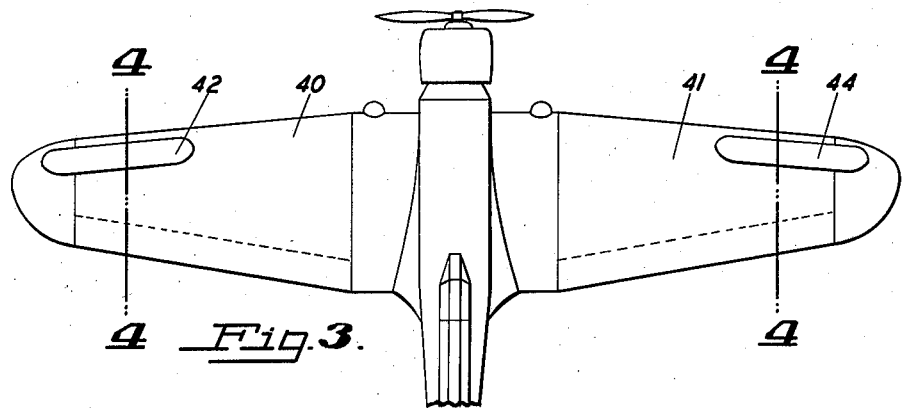
Figure 3 is a plan view of a plane equipped in accordance with this invention, the tail surfaces being omitted from this view in order to conserve space.

To explain fully the system of our invention, a specific embodiment will first be described in detail, following which the underlying principles will be further discussed.

The structural details of the wing 1, whose leading portions are shown in section in Figure 1, are not shown in the drawings since they are immaterial as regards the present invention, but the preferred form is a stressed skin, multicellular type of metal wing similar in general construction to the other parts which are shown in detail. Within the wing, and running longitudinally thereof, are vertical struts or bulkheads 2 and 4 upon which the control mechanism is mounted, and rising above the wing from the member 4 is a strut 5, to the upper end of which the auxiliary airfoil 6 is hinged. Since the purpose of this airfoil is that of an aileron it will be hereinafter so denominated, although it is to be borne in mind that it exercises an additional function and that its mode of operation is under certain circumstances quite different from ailerons of the usual type.

The aileron structure shown comprises a succession of nested channels, the first channel 7 forming the leading edge of the airfoil, while the following channels 9 and 10 are each successively nested within the open ends of the preceding channels to form the airfoil. A bearing support block 11 is secured to a bulkhead positioned within the channel 9 parallel to the plane of the drawings, and to the support block a bearing block 12 is fastened by the screws or bolts 14.

The upper ends of the strut 5 are forked to receive the bearing block, which is journaled, preferably by a ball bearing, on the shaft 15. This bearing or hinge supports one end of the aileron, the other end being carried by a similar mechanism at its far end. It is advisable, though not essential, that the ailerons be statically, dynamically and aerodynamically balanced about the hinge, and it is one of the advantages of this invention that the structure is sufficiently flexible to permit these conditions to be simultaneously achieved. Furthermore, by securing the bearing support block 11 to the bulkhead by the screws 16, it is possible to make slight adjustments in position which may be necessary finally to secure such balance.

A similar bearing block 17 is similarly mounted within the channel 10, and carries a bearing block 19 upon which is journaled a connecting-rod 20, extending downwardly within the wing 1. It will be understood that the lower portions of the channels 9 and 10 are slotted to admit the passage of the strut 5 and connecting-rod 20.

Mounted on the bulkhead 2 is a triangular bracket 21, U-shaped in cross section, between the arms of which is mounted the mechanism for actuating the connecting-rods. A pulley 22 is journaled to one of the bracket arms, and affixed thereto is a crank arm 24. A substantially similar crank arm 25 is journaled to the other arm of the bracket, and a bolt or shaft 26, passing through both crank arms, forms the crank pin, carrying the bearing for the lower end of the connecting-rod 20. A cable 27 passes around the pulley 22 and is fastened thereto, in order to give a positive drive. This cable passes from the pulley toward the leading edge of the wing, making a substantially right angle turn about the pulleys 29 and 30, and thence passing to the control stick, to which its ends are fastened in the usual manner. A streamlined fairing 31 surrounds the strut 5 and connecting-rod 20.

Before considering the operation of this device, a number of points are to be noted. The airfoil 6 is shown as being slightly cambered, and this is to be preferred, but it may be of symmetrical section without departing from the spirit of this invention. It is shown in the neutral position, which is parallel to the normal airflow over the wing. The crank-arm 24 forms an oblique angle— in this instance an acute angle—with the connecting-rod, so that as the crank is rotated in a clockwise direction, the leading edge of the aileron will first be raised until the crank passes dead center, while continued rotation in the same direction will again depress the leading edge. For counter-clockwise rotation, however, the leading edge will be depressed. For extremely small angles of movement from the neutral position the rise of the leading edge of one aileron will be substantially equal to the depression of the leading edge of the other, but for larger ranges of movement the angles assumed by the two ailerons will be entirely disproportionate.

The preferred position of the aileron surfaces is indicated in plan in Figure 3. In order to secure maximum moment with surfaces of minimum size the ailerons are, of course, positioned adjacent the tips of the wings. In order to secure maximum effectiveness the aileron chord length should be from 10% to 20% of the average chord length of the wing in the area affected by the aileron, and they should be mounted from one-third to two-thirds of their own chord lengths above the wings, the hinge being located above the leading one-fifth of the wing chord. It is to be understood that certain of the effects aimed at can be secured with dimensions departing from those given, which are not to be interpreted as defining the ultimate limits of the invention but merely the preferred arrangement. Within these limits, aileron areas as small as 5% of the total wing area give adequate control.

In order fully to appreciate the operation of this invention it will be necessary to consider briefly the usual type of aileron. This is customarily mounted adjacent the trailing edge of wing, or forms a part thereof, and in use its angle, as referred to the main wing, is changed. The change in angle of this portion of the supporting surface changes its contribution to the lift of the wing, effectively changing its camber and angle of attack, increasing this angle on one wing and decreasing it on the other in order to produce the required rolling moment. At normal flying speed it is entirely effective, although it is difficult at extremely high speed to prevent over-control, due to the extreme sensitivity of the wing to slight changes in camber under these conditions.

This type of aileron has, however, a number of inherent disadvantages. First, its point of attachment to the wing is the point of least structural strength, and it is difficult to find space for adequate support and control members within this section of the wing. This type of aileron is attached at the point where the aerodynamic forces which are effective upon it contribute the greatest possible torsional moments to the wing, and the combinations of minimum support and maximum moments tend to set up torsional vibrations or "flutter" which may be extremely serious, especially if an actual period of vibration of the aileron approaches resonance with that of the wing. Since the acting forces under these circumstances are aerodynamic, and since these forces vary with speed, it is extremely probable that there will be certain speeds within the flying range where resonance and dangerous flutter may occur.

The second and much more serious disadvantage of the ordinary aileron structure is its loss of effectiveness at low speed and correspondingly high angles of attack. Since the forces act in proportion to the square of the speed, it is obvious that the aileron angles must be greatly increased at lower speed in order to give the same moments produced by relatively small angles at high speed. At angles approaching stall, where control is most necessary, the ordinary aileron loses its effectiveness altogether. The aileron normally increases the lift on the low wing by increasing its angle of attack. The angle of stall is the maximum angle of attack at which the wing will produce lift in the normal manner; above this angle the airflow above the wing becomes turbulent and lift is suddenly reduced. It will be seen therefore that under this condition the attempted use of the aileron to produce control will actually decrease the lift of the low wing instead of increasing it, and its entire effectiveness is lost.

The natural result of this is that the plane falls off into a spin, where the third great disadvantage of the ordinary aileron structure becomes apparent. Here the low wing is traveling slowly, the higher wing relatively fast, and the effective angle of attack of both wings is relatively high. In order to effect recovery it is desirable not only to raise the low wing, but to produce a yawing moment tending to turn the plane in the opposite direction from that in which it is spinning, thus increasing the speed of the low wing as well as increasing its lift. The instinct of the pilot is to use his ailerons in the normal manner, but this actually serves to increase the difficulty, since the normal use of the ailerons still further retards the low wing and produces an unfavorable yawing moment which tends to prevent recovery. It is therefore necessary to rely upon the rudder, and the attitude assumed by the plane is such that the rudder is usually largely if not completely blanketed by the horizontal control surfaces.

The use of our aileron avoids these disadvantages largely, if not entirely. It is at once apparent from a mere inspection of the structure that it is mounted at the point of maximum strength in the wing, rather than at the point of minimum strength, and that the twisting moments produced by it in the wing itself are negligible. Its susceptibility to static and aerodynamic balance also practically eliminate any possibility of flutter.

It has been recognized for some years that at angles approaching stall a very powerful factor in control is the direction of the airflow over the upper surface of the wing. The various types of wing slots, for increasing the lift under these conditions, and the use of "spoilers" for decreasing lift are well known examples of this type of control. Efforts to combine slots and spoilers with aileron action have not, however, been successful in the past.

The ailerons of our invention do, however, effect a control of this type, which merges gradually and imperceptibly with the usual aileron action. This is illustrated by Figures 4 and 5.

Figure 4:
Figure 4 is a diagrammatic view of a pair of wing sections, indicating the positions of the auxiliary airfoils showing their position in producing a rolling moment at high speed.

Figure 4 shows the effect of the ailerons on the two wings as utilized at high speed and low angle of attack, the figure being a diagrammatic representation of the left wing 40 and right wing 41, with their respective ailerons 42 and 44 so set as to depress the left and raise the right wing. The small arrows 45 and 46 indicate roughly the direction of the new forces upon the ailerons brought into play by their deviation from normal position, which produce the required rolling moment. At the speeds under consideration the effect on the airflow over the main wing of these departures from the neutral position is negligible, but since the forces symbolized by the arrows are proportional to the square of the speed, the moments produced are entirely adequate. In this and the following figure the flight is assumed to be substantially horizontal.

Figure 5:
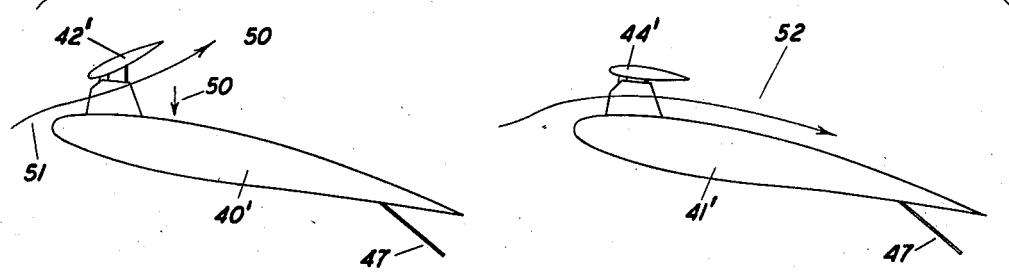
Figure 5 is a view similar to Figure 4, but showing the positions of the auxiliary airfoils at maximum angles of attack.

In Figure 5 is shown the condition obtaining when it is desired to produce a similar moment at angles of attack approaching stall. It may be assumed in this case that the speed has been decreased, the effective camber of the wing is increased by means of the trailing-edge flap 47, and the wing is approaching stall.

It will be seen that here continued motion of the stick in the same direction as in the preceding figure has further increased the angle of the left aileron 42', causing a downward force upon the aileron which is, however, of relatively small magnitude, as indicated by the arrow 50. The principal effect of the aileron is in deflecting the airflow up and away from the upper surface of the wing, causing turbulence and substantially destroying its lift, the course of the current being roughly indicated by the arrow 51. The aileron 44', however, has returned substantially to its neutral position, with respect to the wing. In this posture it may, of itself, contribute something to the lift of the wing, but its principal function is to direct the airflow along the wing-surface in the manner generally indicated by the arrow 52. This greatly increases the lift of the wing, and thus gives normal aileron control even at maximum angles of attack.

The posture of the aileron as thus shown also contributes a powerful turning moment in yaw which further tends to produce the effect desired. The aileron 44' is in position to contribute minimum head resistance or drag, thus permitting the right wing to speed up. The aileron 42', however, is at the same time contributing a powerful drag, tending to slow the left wing and further decrease the lift. Careful tests have shown that the yawing moment thus produced may easily be from one-half to two-thirds of that normally produced by maximum motion of the rudder. For this reason, the natural and subconscious impulse of the pilot so to use his stick as to aileron out of the spin tends in the strongest possible manner not only to raise the low wing but to produce a turning movement opposite to that of the spind and favorable to recovery, whereas this same subconscious movement would, with the usual aileron, merely accentuate the difficulty. No small part of the value of this invention lies in the fact that spin recovery is accomplished in the same normal manner as is recovery from an ordinary banking turn.

The invention is particularly applicable in cases where trailing-edge flaps 47, as shown in Figure 5, are used. Such flaps not only make the mechanical problem of installing the ordinary ailerons extremely difficult, but also largely decrease their effectiveness. For this reason past practice has been to compromise between flap effectiveness and aileron effectiveness, with a result which has generally been unsatisfactory.

Positioned as described, the ailerons of this invention contribute more to the lift of the wing in normal flight than they do to the drag, and the entire assembly constitutes a more efficient wing, in terms of maximum lift and minimum drag, than would be obtained by adding the area of the ailerons to the main wing. Advancing the aileron farther toward the leading edge of the wing, or moving it toward the rear, does not materially change its effect at high speed. At low speed, however, advancing the aileron decreases its effectiveness in deflecting the airflow away from the wing and decreasing the lift, while moving it to the rear causes blanketing at high angles by the wing itself, and decreases its effectiveness in deflecting the airstream downward.

We claim:

1. In combination, an airplane wing, a lateral control surface comprising an auxiliary airfoil hinged above the upper surface of the forward half of a laterally extending portion of said wing, and control means for said airfoil comprising a connecting-rod pivotally connected to tilt said airfoil, a crank for actuating said connecting rod, and means for moving said crank through a limited arc, said crank being positioned to form an acute angle with said connecting-rod at the median point of said arc, whereby motion of said crank in one direction will swing said crank and connecting-rod past dead center to produce first an increasing and then a decreasing tilt of said airfoil in one direction, and motion of said crank in the opposite direction will produce a constantly increasing opposite tilt of greater magnitude.

2. In an airplane, a control surface and control means therefor, as recited in claim 1, positioned on said wing on each side of the longitudinal axis of said claim, said cranks being disposed in parallel relationship in their neutral position and rotatable in opposite directions for the control of lateral stability of said aircraft.

EDMUND T. ALLEN.
ARTHUR L. KLEIN.
CLARK B. MILLIKAN.
JOHN K. NORTHROP.